United States Patent [19]

Hibbard

[11] 4,399,470
[45] Aug. 16, 1983

[54] OPTICAL SCANNING SYSTEM

[76] Inventor: Earl R. Hibbard, 1718 Virginia St., Berkeley, Calif. 94703

[21] Appl. No.: 257,655

[22] Filed: Apr. 27, 1981

[51] Int. Cl.³ ............................................. H04M 1/00
[52] U.S. Cl. ...................................... 358/284; 358/166
[58] Field of Search ................ 358/166, 284, 138, 282

[56] References Cited

U.S. PATENT DOCUMENTS 4,315,285  2/1982  Sommer et al. ...................... 358/285

OTHER PUBLICATIONS

Y. M. Ting and W. Wilson, Fingerprint Image Enhancement System, I.B.M. Technical Disclosure Bulletin, No. 8, vol. 16, Jan. 1974.

Primary Examiner—Robert L. Griffin
Assistant Examiner—Edward L. Coles
Attorney, Agent, or Firm—Flehr, Hohbach, Test, Albritton & Herbert

[57] ABSTRACT

A system for scanning recorded information processes a video output of the scanner in a manner providing a digital representation of dark and light portions of the information scanned. A reference voltage derived from each pulse or slope of the video output provides a reference against which the original pulse or slope can be compared to indicate transition of the slope across the reference voltage to generate a digital output representative thereof.

8 Claims, 6 Drawing Figures

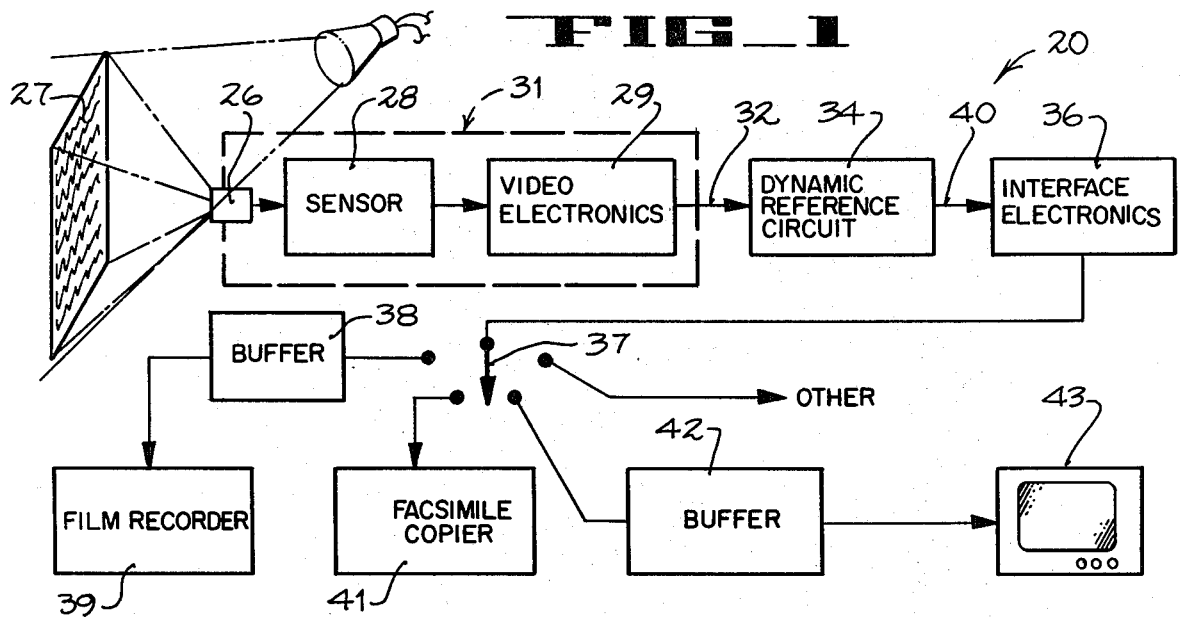
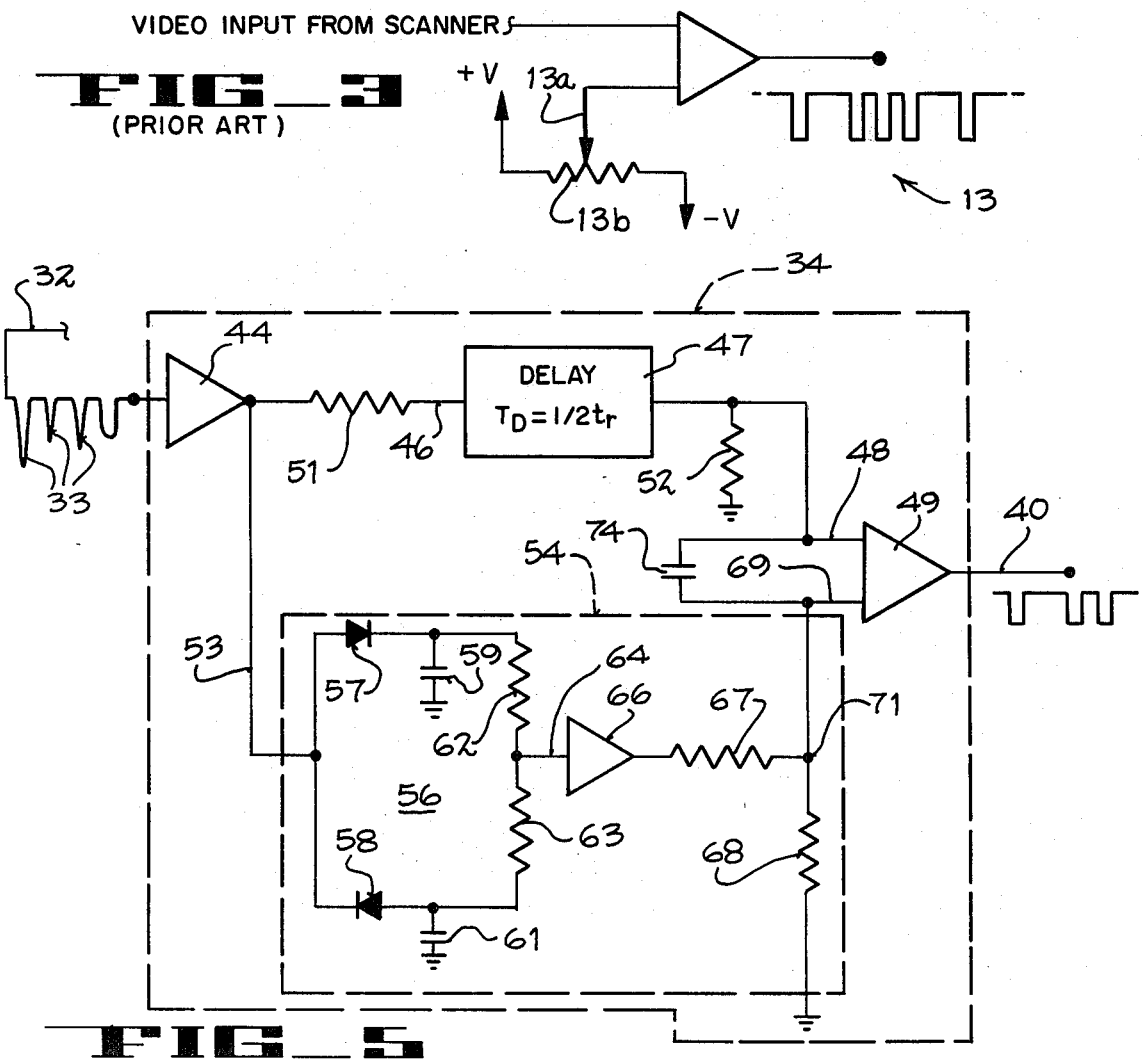

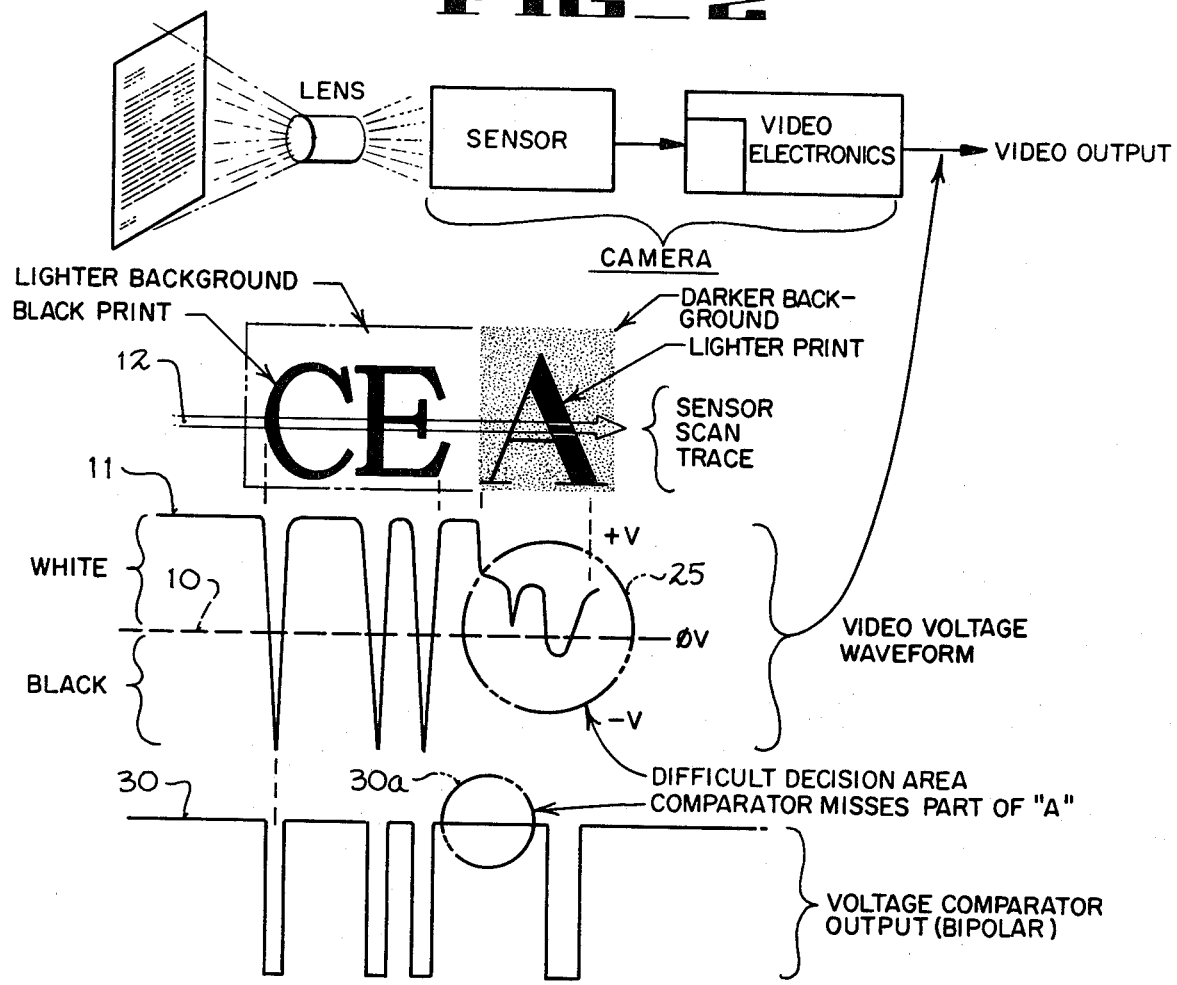
FIG_2
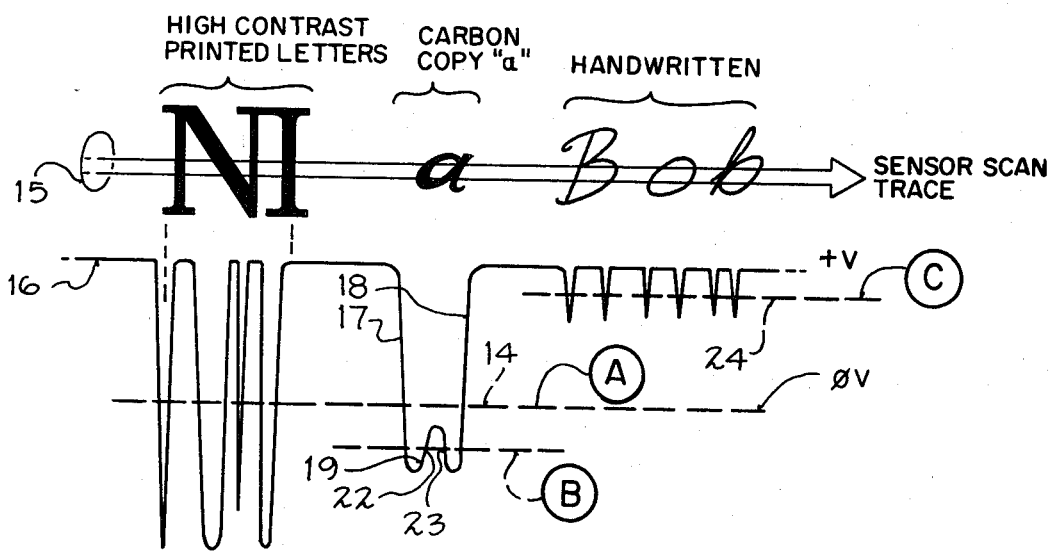
FIG_4

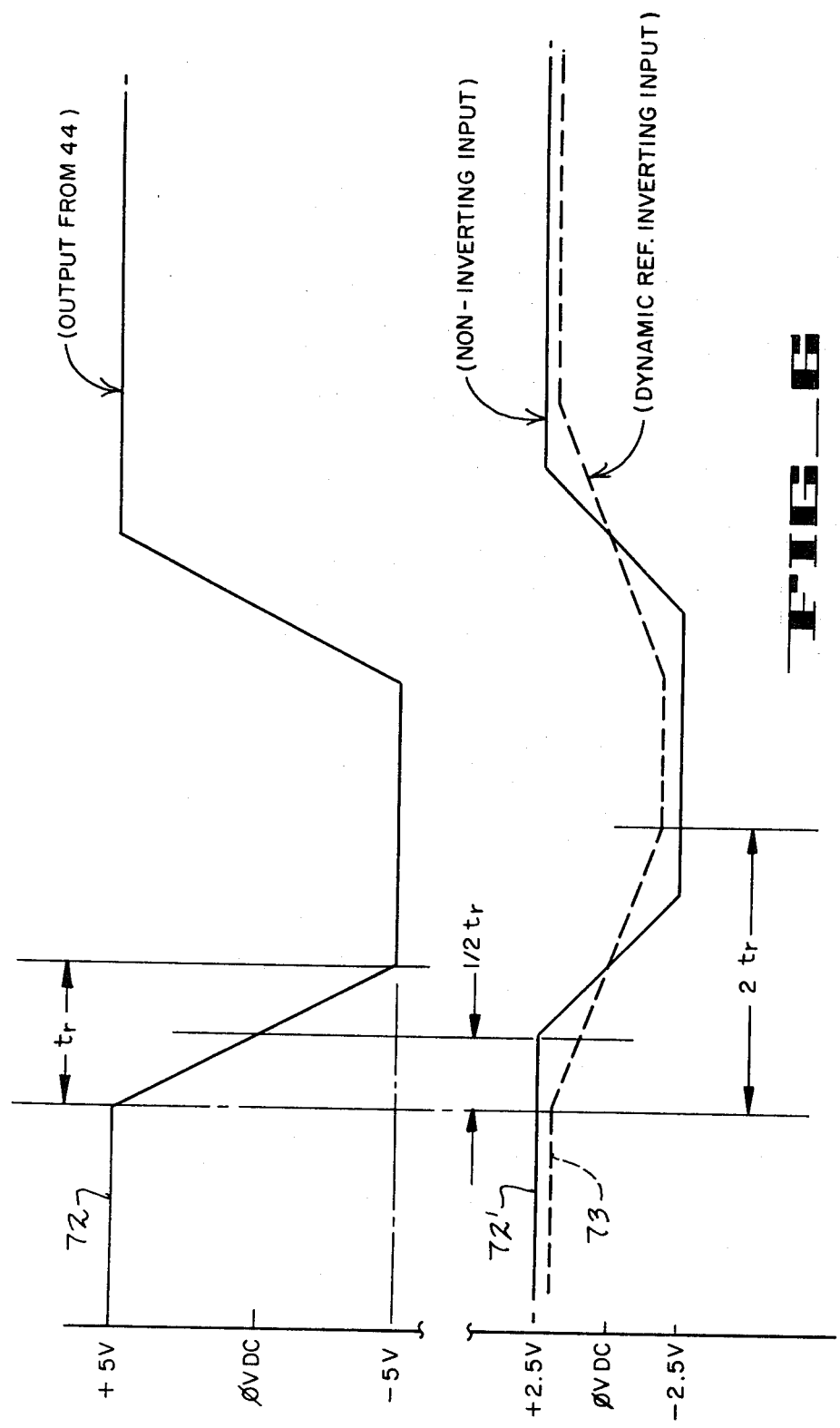

OPTICAL SCANNING SYSTEM

This invention pertains to a system for optically scanning recorded information in a manner providing a waveform which varies in response to scanning dark and light portions of the information, and wherein the dark and light portions thereof generate a digital representation thereof. More particularly, this invention pertains to such a system characterized by circuit means providing a dynamic reference for discrete portions of the waveform and against which such discrete portions can be compared so as to identify such portions as representing dark or light parts of images scanned.

BACKGROUND OF THE INVENTION

In electro-optical sensing systems for scanning an image to provide black and white output representations of parts of the image without intervening shades of grey, such systems will reproduce a relatively faithful image of the original document when the original consists of clean, sharp, black print or typing on a clean, white background. However, if the document scanned is, for example, a fourth generation carbon copy, or contains handwriting in pencil or fine line pen markings, or even has a colored or partially shaded background behind the print, then the legibility of the resulting copy can be impaired. Typically, in systems of the kind referred to above, colored, partially colored or shaded backgrounds result in large black areas on the copy which obliterate the printed information.

A fourth generation carbon copy, when used as an original, will reproduce with very blotchy, illegible print at the output of the scanning equipment. Should some or all of the print on the original provide a low contrast between the print and the background, some or all of the low contrast print will be deleted from the copy.

The problems in such systems manifest themselves in a number of ways, such as by deleting letters or words or portions of either; providing blotchy print with no or few openings in the "e's, o's or b's", dimensional distortion of line widths and position (in the letters in particular), and areas of the reproduced copies will be black or streaked with black where the original page was white.

These problems and others result from the difficulty in making proper decisions as to whether portions of the scanning output signal should be considered as representative of black or white.

For example, the problem can be best explained with reference to FIG. 2 wherein the output video waveform 11 shows a time varying voltage representing the scanner output during a portion of one transverse scan across a page of print. Such a scan is represented by the narrow trace 12 defining the path along which the scan is made. The positive voltage portion of waveform 11 represents white paper background, while the negative spikes or pulses represent black print. A reference voltage typically is established, as at line 10.

Normally, in modern equipment, the decision as to which portions of the waveform represent black or white, is made by a voltage comparator 13 (FIG. 3) in which a given predetermined reference voltage is established, as on lead 13a coupled to potentiometer 13b. As shown in FIG. 3, potentiometer 13b controls comparator 13 whereby (as shown) any voltage level below the predetermined voltage level at the potentiometer setting will be identified as being black and any signal which is more positive will be considered to be white. This arrangement is appropriate for large, black, sharp print on white paper. However, with poor contrast or print which is not sharp and large, the decision as to whether the signal represents black or white becomes difficult. Note the region of waveform within circle 25 and the resultant loss of digital data at 30a of the trace 30. Trace 30 indicates a digital representation of the scanned information.

As shown in FIG. 4, if a reference voltage is set at the level represented by the horizontal line 14 (hereinafter referred to as reference level "A" and a transverse scan of the recorded information is made (as represented by the narrow band 15, defining the path of a scanning trace) the sharply printed letters "NI" will clearly produce appropriate transitions of reference level "A". Accordingly, by dropping beneath level 14, (and using the convention that a voltage below the reference is "black" and above the reference level is "white") the signals derived from scanning the "NI" will be identified as "black". However, the carbon "a" will have no opening in it since waveform 16 provides only a first transition at 17 and a second transition at 18 while the small pulse 19 between transitions 17 and 18 remains undetected since the voltage fails to rise to reference level "A".

If the reference level voltage is adjusted to the line 21 (hereinafter referred to as reference level "B") so as to detect two additional transitions 22, 23 the carbon copy "a" will then be properly identified. The handwritten term scanned along the path 15 cannot be detected by either reference level "A" or "B" and would be completely deleted from any copy made by such a scanner using a comparator system 13. A reference level "C" at 24, however, will reproduce the handwriting but obviously such a reference level will not properly detect the opening in the "a".

While one system is known in which a dynamic reference voltage is developed from the incoming video signal for comparison to a delayed representation of the same video signal, it has been observed that its decision making function provides inconsistent results whereby the lines of a scanned character may be randomly widened or narrowed so as to distort the characters. This system also causes openings to be closed in characters such as "a's, b's, e's" etc.

It has been discovered that by causing the reference voltage to intersect the slopes of the pulses substantially at a predetermined displacement therealong, the foregoing inconsistent printing can be avoided as herein to be disclosed further below.

The system for optically scanning recorded information as disclosed herein provides a reference voltage with respect to and derived from the various pulses representative of black and white portions of information scanned. The reference voltage intersects each pulse substantially at the midpoint or other predetermined proportionate displacement along the positive and negative slopes thereof whereby means for comparing the voltage of one of the signals with respect to the reference voltage for that signal serves to detect crossover of the voltage of said signal with respect to the dynamic reference voltage thereof. Accordingly, the reference voltage as disclosed herein dynamically follows the video waveform and intersects each pulse substantially at the midpoint of each positive and negative slope, (or at another predetermined point therealong, if desired).

SUMMARY OF THE INVENTION AND OBJECTS

In general, there is provided a system for optically scanning information to provide varying pulses in response to scanning dark and light portions of an image. Means for developing a reference voltage with respect to the varying pulses provides a reference voltage dynamically responsive to the pulses so as to cause the reference voltage to lie at a level intersecting the positive and negative slopes of each pulse substantially at a predetermined position displaced therealong. Means for comparing the voltage of one of the pulses with respect to its associated reference voltage serves to detect crossover of the voltage of the signal with respect to the reference voltage thereof derived from the signal.

In general, it is another object of the present invention to provide such a system for more accurately detecting the information notwithstanding poor quality thereof.

It is yet another object of the present invention to provide a scanning system characterized by means for generating a reference voltage which dynamically follows the pulses representative of scanned information and which reference voltage intersects each pulse at the midpoint of each positive and negative slope thereof.

It is yet another object of the present invention to provide a scanning system characterized by means for generating a reference voltage derived from and which dynamically follows each of the pulses representative of scanned information and which reference voltage intersects each pulse at the midpoint of each positive and negative slope thereof.

The foregoing and other objects of the invention will become more readily evident from the following detailed description of a preferred embodiment, when considered in conjunction with the drawings.

BRIEF DESCRIPTION OF THE DRAWING

FIG. 1 shows a diagrammatic view of a system in association with various applications for same, according to the invention;

FIG. 2 shows various waveform diagrams derived from scanning associated printed material by means of a known scanning unit for purposes of demonstrating problems involved with use of prior art comparators;

FIG. 3 shows a comparator as used in scanning characters, according to the prior art;

FIG. 4 discloses a diagram for purposes of demonstrating problems caused by employment of a predetermined reference voltage for all pulses;

FIG. 5 shows a diagrammatic view of a circuit employed in the system shown in FIG. 1, according to the invention; and FIG. 6 shows a diagram of a signal for purposes of explaining the operation of the circuitry in FIG. 5.

DETAILED DESCRIPTION OF PREFERRED EMBODIMENT

The electro-optical scanning system 20 shown in FIG. 1 illustrates an appropriate utilization of the system disclosed herein, and as now to be described. Thus, system 20 includes a lens 26 for focusing upon an illuminated document 27. An image of the recorded information on document 27 can be detected, via lens 26, by a video sensor 28 such as the "target" component of a video camera. Known video electronics 29 receive the output from sensor 28 whereby the signal can be conventionally processed, such as by amplification, aperture correction, sample-and-hold, automatic gain control, etc. The processed output signal from video electronics 29 appears on lead 32. Thus, lens 26, sensor 28 and video electronics 29 when combined essentially constitute a vidicon camera 31.

Video signals from lead 32 supply a varying waveform including pulses 33 to the input side of a dynamic reference circuit 34. Circuit 34 serves to process signals 33 in a manner whereby improved decisions can be made during the scanning of an image on a dynamic basis. The output of circuit 34 provides a changing, bipolar voltage giving a relatively faithful account of the "white" and "black" portions of the scanned image as described further below. These bipolar output signals 35 are fed via lead 40 to suitable interface electronics 36 and subsequently to a selector switch 37 selectively positionable to supply the output from interface electronics 36 to one of a plurality of utilization devices.

For example, the digital signals at this stage can be stored in a digital buffer 38 for use in conjunction with a film recorder 39. Switch 37 when positioned as shown in phantom lines serves to couple the digital output from the scanner to control a facsimile copying machine 41. In another position, switch 37 supplies the output signals to an additional buffer 42 to provide digitized information for display of an image of the information on the video monitor 43. Thus, means for supplying video input signals to circuit 34 which are representative of prerecorded information optically scanned can include the camera construction 31. Circuit 34 includes a voltage follower 44 coupled to receive signals 33 via lead 32. Signals from voltage follower 44 are supplied along each of two circuit paths. The first circuit path includes a lead 46 coupled to a suitable delay circuit 47 which serves to delay the video signals by an amount equal to approximately one-half the shortest rise time associated with that particular signal.

The output of delay means 47 supplies the video signal to the non-inverting input 48 of a voltage comparator 49. Comparator 49, of known type, develops a bipolar output having one or another of two electric states so as to generate digital output signals to be supplied via switch 37 to a selected portion of system 20. Resistors 51, 52 provide impedance matching elements for delay means 47, and reduces the peak to peak voltage to substantially 50% as represented in FIG. 6.

A second circuit path commences with lead 53 and supplies the same signals taken from the output of voltage follower 44. Lead 53 directs the signals 33 to a dynamic reference voltage generator 54. Reference voltage generator 54 includes a bi-directional slope detector circuit 56 comprising oppositely poled diodes 57, 58 respectively disposed in parallel branches of circuit 56. Each of the two branches of circuit 56 includes a capacitor 59, 61 and a resistance element 62, 63. The output of slope detector circuit 56 on lead 64 becomes the input to a voltage follower 66.

The output of voltage follower 66 when modified by the resistors 67, 68 developes a "reference" voltage signal on the inverting input 69 of voltage comparator 49. Resistors 67, 68 reduce the value of the output from voltage follower 66 on the order of 50%, to correspond to the attenuation of the delayed signal noted above and in FIG. 6.

Accordingly, a given video input signal 33 charges capacitors 59, 61 to the voltage values of positive and negative peaks respectively. The input to voltage follower 66 derives from the output of a voltage divider consisting of resistors 62, 63. If the input waveform remains at a positive value representative of scanning "white", capacitor 59 will become charged to that value. In the event that no change occurs for a prolonged period of time, capacitor 61 will also become charged to the same value. Thus, no voltage drop will appear across resistors 62, 63. When a negative slope occurs, capacitor 59 will retain its charge momentarily while capacitor 61 and the lower end of resistor 63 will follow the slope to a new, lower voltage level thereby causing a voltage to develop across resistors 62, 63 substantially near the peak-to-peak voltage of the pulse representing "black" print.

The voltage at the junction between resistors 62, 63 corresponds approximately to one-half the peak-to-peak value and represents the median voltage of the slope. The output from this junction via voltage follower 66 provides voltage comparator 49 with a dynamic reference level associated with the slopes of each given pulse 33. This reference level against which portions of the waveform arriving via delay means 47 can be compared serves to identify the waveform portions as representing dark or light parts of the images sensed.

While not noted previously, the dynamic reference voltage generator 54 decreases the bandwidth of the transmission of a pulse between voltage follower 44 and the inverting input 69. The bandwidth reduction substantially doubles the shortest rise time of one of pulses 33 and introduces some delay to the pulses 33, see FIG. 6. By virtue of the fact that delay means 47 serves to delay pulses passing therethrough by an amount corresponding for example to one-half the rise time, it will cause the reference voltage to lie at a level substantially bisecting the positive and negative slopes of each pulse. Changing the amount of delay in means 47 causes the reference voltage to intersect the positive and negative slopes of each pulse at a different predetermined proportional displacement therealong. Thus, the output of voltage follower 66 and resistors 67, 68 provides voltage comparator 49 with a reference value by which to initiate an output transition whenever the positive going (or negative going) voltage of the slope of the delayed pulse at the non-inverting input 48 crosses that value.

As noted above, resistors 51,52 constitute a voltage divider which sets the overall peak-to-peak value of the video signal at the non-inverting input 48 to comparator 49. By employing delay means 47, the proper reference level is allowed to be established at the junction 71 as the slope of the video signal on the upper circuit path is applied to non-inverting input 48. In this way, then, when a pulse 33 appears at the output of voltage follower 44, i.e. at the video input, slope detector circuit 56 derives an optimum reference level from the video signal while the video signal, fed via the upper circuit path, is delayed until that reference level voltage has been applied to inverting input 69.

By reducing the reference voltage by a small proportinate amount of the peak-to-peak value of each pulse or slope, intersection of the slope by a reference voltage level will be assured. Such reduction allows circuit 34 to ignore reasonable amounts of noise on the incoming video signal 33 while permitting the circuit to respond to pulses of more than approximately 10% amplitude.

As shown in FIG. 6, by delaying the pulse 72 by an amount equal to one-half the rise time thereof a reference level 73 for the delayed pulse 72' will be established at substantially one-half the maximum voltage of the pulse. Accordingly, a reference voltage for the pulse will intersect the slope of the pulse at a displacement substantially one-half way therealong.

Accordingly, it is evident that the circuit means 34 includes first and second circuit paths each receiving the input signal from the video scanner to be fed via both paths respectively. Means disposed in one of the paths develops a reference voltage with respect to pulses within the signals so received. The last named means serves to delay the signals therealong for a predetermined period corresponding substantially to the rise time of the pulses. Means are disposed in the other circuit path for delaying signals therethrough by a predetermined proportionate amount of the rise time of each pulse. Further, means coupled to the output of each of the circuit paths serves to compare the voltage of one of the signals with respect to a reference voltage derived from the same signal to detect crossover of the voltage of the signal via one path with respect to the reference voltage thereof. Finally, means for representing the dark and light portions sensed as electric states representative of first and second binary digits, respectively, is included in the voltage comparator 49 which is of a type adapted to provide an output state indicative of sensing each transition of a signal across the reference voltage.

Circuit 34, accordingly, proceeds generally by first detecting the slopes or rates of change of voltage of the video waveform at the output of the scanning device or vidicon camera 31. The slope is measured to determine its direction and amplitude. Next, for all slopes above a predetermined rate of change (dv/dt) a white-to-black or black-to-white transition is generated at the processor output 40 according to the sign of the slope. The timing of the transition is preferably determined at approximately the midpoint of the slope. Finally, slopes below a predetermined value are ignored unless the absolute value of the video signal crosses the zero voltage point during a slow rate of change. If that occurs, a transition is then indicated at the output. The direction of the zero voltage crossing determines the "transition polarity" and the timing of the transition coincides with that crossing. Thus, for low rates of change video capacitors 59, 61 virtually have no effect and the voltage at the output of voltage follower 66 will closely follow the video signal on lead 53.

A reference level of substantially zero voltage will be provided when the signal at non-inverting input 48 passes through zero voltage.

Capacitor 74 acts as a noise filter to prevent unwanted transitions at the output which can result from video noise when the two inputs to comparator 49 are very close to the same voltage. The value of capacitor 74 is established so as to give a frequency transmission which has a minus three decibels point at a location slightly beyond the highest video signal frequency of interest. As is known the three decibel point usually serves to mark the beginning of the region where the frequency response will drop off rapidly.

Accordingly, it can be seen that there has been provided an improved scanning system characterized by means for accurately detecting between dark and light portions of information scanned.

I claim:

1. In a system for optically scanning information to provide a digital representation of dark and light portions thereof, a video scanning system comprising a video camera of a type having means for sensing optical images projected thereon to provide a varying waveform in response to scanning dark and light portions of the optical images, circuit means providing a dynamic reference against which portions of the waveform can be compared to identify the waveform portions as representing dark or light portions of the images sensed, and means for representing the dark and light portions sensed as electric states representative of first and second binary digits respectively, said waveform including pulses of varying voltage, and in which said circuit means includes means for developing varying reference voltages with respect to said video waveform to be dynamically responsive to the waveform, the last named means being responsive to each said portion to develop a reference voltage associated with each and unrelated to the voltage of other said portions to cause the reference voltage to lie at a level intersecting the positive and negative slopes of each pulse substantially at a predetermined proportionate displacement therealong.

2. The system according to claim 1 in which said level lies substantially at the midpoint along said positive and negative slopes.

3. In a system for optically scanning information to provide varying pulses or voltage transitions between values representative of black and white in response to scanning dark and light portions of an image, means for developing an associated reference voltage with respect to each discrete one of said varying pulses or transitions, said reference voltage for any said pulse or transition being derived from information primarily therein and unrelated to information provided by other pulses or transitions, said reference voltage intersecting each pulse substantially at the midpoint of the positive and negative slopes thereof, and means for comparing the voltage of portions of said pulses and said varying reference voltage associated therewith and derived therefrom to identify those pulses representative of light and dark portions of said scanned image.

4. In a system according to claim 3 in which the first named means serves to discriminate between steady state dark or steady state light portions scanned.

5. In a system for optically scanning information to provide varying pulses in response to scanning dark and light portions of an image, means for developing a reference voltage derived from and associated with each said varying pulse unrelated to the reference voltage of other pulses, said reference voltage being dynamically responsive to said pulses so as to intersect each pulse substantially at a predetermined proportionate displacement along the positive and negative slopes thereof, and means for comparing the voltage of portions of said pulses and the associated said varying reference voltage thereof to identify those of said portions of said pulses representative of light and dark portions of said scanned image.

6. A system according to claim 5 in which the first named said means includes means for developing the median value of the positive or negative slopes of each pulse.

7. In a system for optically scanning recorded information to provide a digital representation of dark and light portions thereof, a video scanning system comprising a video camera of a type having means for sensing optical images projected thereon to provide a varying waveform in response to scanning dark and light portions of the optical images, means coupled to receive said waveform for developing reference voltages associated respectively with pulses carried within said waveform, each said reference voltage being derived from information in its associated pulse unrelated to information in other pulses, means for delaying the waveform by an amount corresponding substantially to a predetermined portion of the rise time of said pulses carried within said waveform, means for comparing the voltage of a portion of one of said pulses with respect to the reference voltage for same to detect crossover of the voltage of said portion with respect to the reference voltage thereof, and means serving to establish said crossover at a predetermined displacement along a slope of each of said pulses.

8. In a system for optically scanning information to provide a digital representation of dark and light portions thereof, means for scanning prerecorded optical information, means coupled to the last named means for supplying a varying video signal representative of prerecorded information scanned, circuit means including first and second circuit paths each receiving said video signal to be fed via both paths respectively, means disposed in one of said paths for continuously detecting the median voltage of the slope of said signal, and means for developing related reference voltages based on the voltage of each of the pulses within said video signal unrelated to the voltage of other pulses within said signal, the last named means serving to delay said signal therethrough for a predetermined period corresponding substantially to the rise time of said pulses, means disposed in the other said circuit path for delaying said signal therethrough by a proportionate amount of the rise time of the pulses in said signal, means coupled to the output of each said circuit path for comparing the voltage of the video portions of signals fed via one of said paths with respect to the reference voltage for said portions to detect crossover of the voltage of said portions of said video signal with respect to an associated reference voltage, said slope detector means serving to establish said crossover at a predetermined displacement along a slope of each of said pulses.

* * * * *